United States Patent

Davert

[11] 4,272,890
[45] Jun. 16, 1981

[54] LATTICE TEMPLATE

[75] Inventor: Edward J. Davert, Seattle, Wash.

[73] Assignee: The Boeing Company, Seattle, Wash.

[21] Appl. No.: 99,158

[22] Filed: Nov. 30, 1979

[51] Int. Cl.³ .................. G01B 3/00; E06B 3/00
[52] U.S. Cl. .................... 33/174 G; 33/189
[58] Field of Search .................. 33/174 G, 189, 192

[56] References Cited

U.S. PATENT DOCUMENTS

| | | | |
|---|---|---|---|
| 1,545,424 | 7/1925 | Heimrich | 33/189 |
| 2,548,197 | 4/1951 | Conner | 33/174 G |
| 4,058,902 | 11/1977 | Hall | 33/174 G |

Primary Examiner—Willis Little
Attorney, Agent, or Firm—Conrad O. Gardner; B. A. Donahue

[57] ABSTRACT

A lattice template for locating aircraft structure and pilot holes behind flat or contoured surface panel structures. The lattice structure of template strips positioned by bridge structures or flexible cables enables adjustment of template strips within the lattice template thereby enabling coordination with its respective structural element to accommodate tolerances of assembly.

1 Claim, 8 Drawing Figures

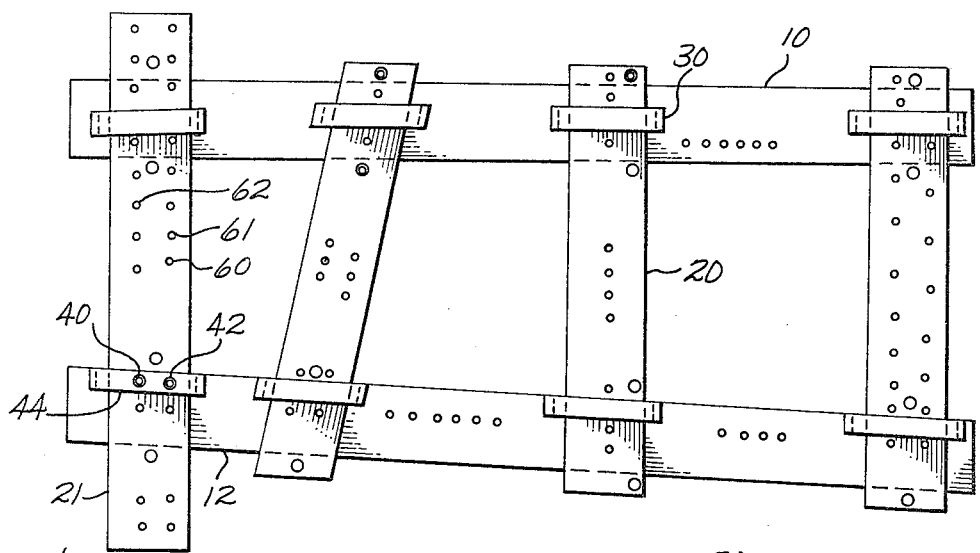
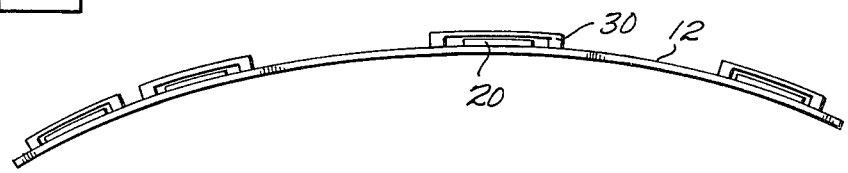
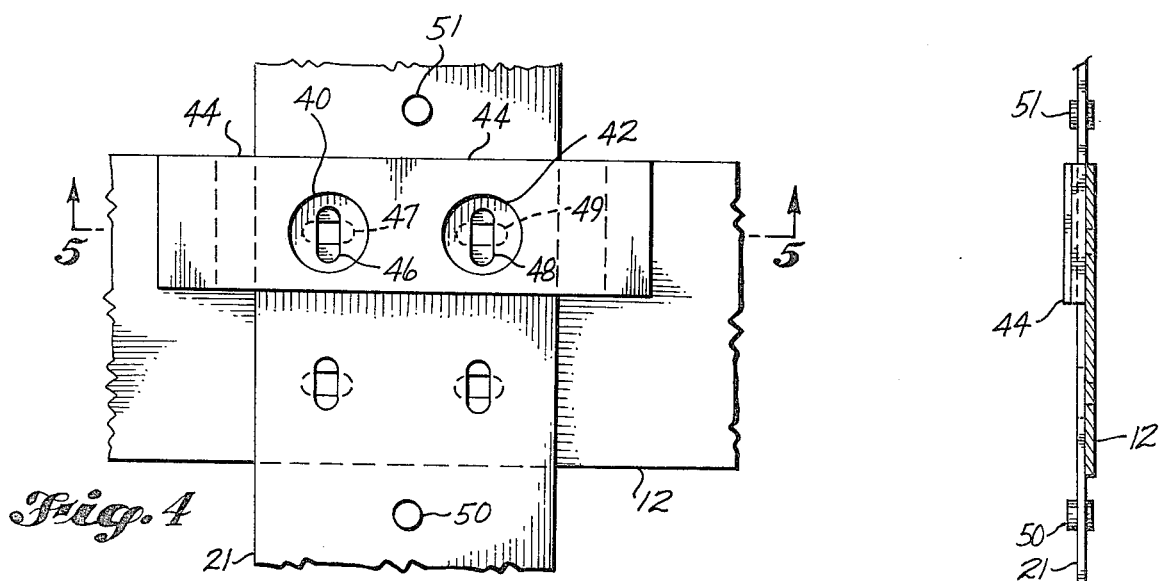
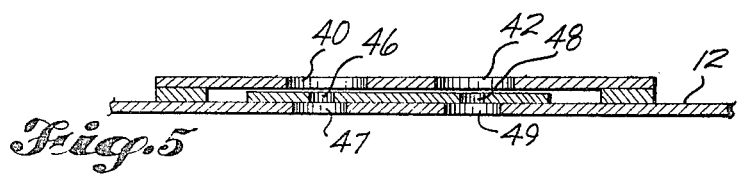

LATTICE TEMPLATE

This invention relates to apparatus for locating aircraft structure and pilot holes behind large panels such as aircraft skin panels and more particularly to strip template structures for accommodating the tolerances of assembly.

All structural and pilot hole locations are not accessible from behind aircraft skin panels and also there is shift in relative position from aircraft to aircraft due to tolerances of assembly. Heretofore location of these holes has been accomplished by disposal of temporary one time acetate hole location duplicating templates on the outer skin surface. Attempts to eliminate the use of temporary templates by preparation of a large area hole and structure layout template are unsatisfactory in that aircraft structure parts vary slightly in shape and position, thus throwing off hole positions. Individual templates for each hole pattern and structural element are difficult to store, select or index on correct detail.

Further, duplication of hole patterns for each aircraft structure resulting in temporary tooling and one time use are costly for man hours and material and not economical.

As a consequence, in order to locate drilled holes for riveting skins to substructure without locating skins on the structure and backdrilling the skins through predrilled pilot holes in the structure it is an object of the present invention to provide means for locating hole positions for skin side drilling which accommodate tolerances of assembly.

It is a further object of the invention to provide template means having freedom of motion for providing coordination with respective structural elements.

It is yet another object of this invention to provide template means adaptable for use on contoured surfaces.

It is still a further object of this invention to provide a lattice template structure having slots in fastener positions at intersections thereby allowing for tolerance of structure location.

These and other objects of this invention are accomplished, in accordance with a preferred embodiment of the invention by a lattice type template having a plurality of individual flexible strip templates held in position by utilization at intersections of the lattice of bridge structures or flexible cables.

Further objects, features and advantages of the invention will readily become apparent from the following specification and from the drawings, in which:

FIG. 1 is an elevational view of the present lattice template system showing intersecting template strips;

FIG. 2 is an end view of a template strip in the lattice template system of FIG. 1 displayed on a curved surface;

FIG. 3 is an end view of the template strip of FIG. 2, however shown stored in a flat position;

FIG. 4 is an elevational view of an intersection of template strips taken at the lower left corner of the lattice template system of FIG. 1;

FIG. 5 is a sectional view taken along the line 4—4 of FIG. 4 showing bridge structure detail at template strip intersection;

FIG. 6 is an end view of the section of FIG. 4 showing bridge and retainer button;

Figure 7:
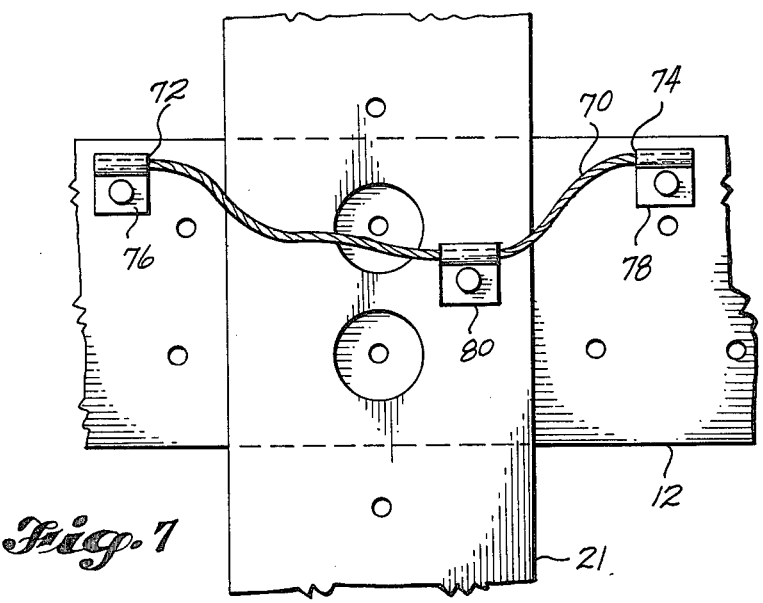
FIG. 7 shows cable restraint at template strip intersection as an alternative to bridge restraint shown in FIGS. 1 through 6; and, FIG. 8 is an end view of the cable restraint shown in FIG. 7.
Figure 8:
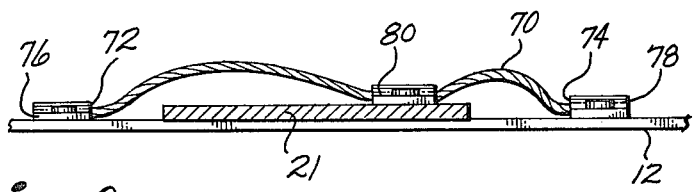

Turning now to FIG. 1 it will be observed that a plurality of strip templates, e.g. including strip templates 10 and 20 comprise the lattice template system as shown in this Figure. The lattice template system of FIG. 1 includes a plurality of bridge structures, e.g. bridge structure 30 for holding together strip template 10 and 20 at an intersection. Such means of retaining strip templates together provides sufficient freedom of movement such that each of the strips can be adjusted with or coordinated to its respective structural element thereby accommodating the tolerances of assembly. As can be seen in FIG. 2, since element 10 of the lattice template system is a flexible strip template, utilization thereof may also be on curved surfaces.

Turning now briefly to FIG. 3 it can be seen that template strip 10 will also store in a flat condition.

FIG. 4 shows details of lattice template structure at the intersection of flexible strip templates 12 and 21. Note may be taken especially of clearance holes 40 and 42 in bridge structure portion 44 of strip template 12 allowing access to underlying slots 46, 47 and 48 and 49, respectively, of template strips 12 and 21.

Also, it can be observed that only at intersections or overlapping portions of the lattice template system are hole patterns of slotted form in contrast to other hole patterns, e.g. 60, 61 and 62 (see FIG. 1) which slotting configuration at intersections being for the purpose of retaining allowable edge margin on detail position.

U-shaped bridge structure portion 44 of strip template 12 allows relative movement of strip templates 12 and 21 with respect to each other, such motion limited by raised button portions 50 and 51 of the respective intersecting strip template, in this case member 21 not carrying the bridge structure portion. FIG. 6, the side view of the intersection of strip templates is illustrative of button 50 and 51 retaining means for limiting travel provided between intersecting strip templates by the bridge structure portion.

Turning now to an alternative embodiment for providing sufficient freedom of motion at intersections of strip templates to allow duplication of the tolerance of detail positioning in the assembly of the lattice template system, it will be seen that a cable 70 with ends 72 and 74 fixed by fasteners 76 and 78 to strip template 12 is looped over strip template 21 and fastened thereto by fastener 80 of strip template 21. Details of this arrangement (instead of the hereinbefore discussed bridge structure) provides greater freedom of movement at template intersections, a requirement for lattice template systems deployed on compound contoured assemblies. A cable 70 allows greater freedom between strip templates at intersections and also provides for greater flexibility of flexible strip templates at intersections than the aforementioned embodiment utilizing bridge 44 restraining means.

The present lattice template systems for guiding the drill point are permanent and reusable, applicable to contoured surfaces, and adjust to the variable location of structural details. Provisions are included for locating fastener centerline intersections, a requirement for accommodating allowable hole spacing tolerance which occurs at the ends of the strip templates where structure continues past other structure. Strip template width in a preferred embodiment was 2 inches plus the outside diameter(s) of the drill bushing(s), while thickness thereof was not less than about 0.080 inches nor greater than about 0.130 inches.

What is claimed is:

1. In configuration:
   a plurality of drill templates having holes extending therethrough, said plurality of drill templates extending in a predetermined direction;
   a further plurality of drill templates having holes extending therethrough, said further plurality of drill templates extending in a further predetermined direction;
   said plurality and said further plurality of drill templates forming points of intersection at respective points of overlap with each other;
   means for providing limited relative motion between said plurality and said further plurality of drill templates at said points of intersection; and,
   wherein said means for providing limited relative motion between said plurality and said further plurality of drill templates comprises a cable member disposed at each of said points of intersection, each of said cable members having the ends thereof fastened to corresponding ones of said plurality of drill templates at each of said points of intersection, and a portion intermediate the ends thereof fastened to corresponding ones of said further plurality of drill templates at each of said points of intersection.

* * * * *